(No Model.)

T. LEAMAN.
SHAFT COUPLING.

No. 350,631. Patented Oct. 12, 1886.

Witnesses,
Robt. H. Porter.
Wm. M. Wilkins

Inventor,
Thos. Leaman
Per: Hallock & Hallock
Atty's.

UNITED STATES PATENT OFFICE.

THOMAS LEAMAN, OF ERIE, PENNSYLVANIA.

SHAFT-COUPLING.

SPECIFICATION forming part of Letters Patent No. 350,631, dated October 12, 1886.

Application filed June 8, 1886. Serial No. 204,522. (No model.)

*To all whom it may concern:*

Be it known that I, THOMAS LEAMAN, a citizen of the United States, residing at Erie, in the county of Erie and State of Pennsylvania, have invented certain new and useful Improvements in Shaft-Couplings; and I do hereby declare the following to be a full, clear, and exact description of the invention, such as will enable others skilled in the art to which it appertains to make and use the same.

My invention relates to shaft-couplings; and it consists in certain new and useful improvements in the construction of the same, as will be hereinafter fully set forth, and pointed out in the claims.

The object of my invention is to provide a coupling for shafting which shall be flexible, and thus enable the shafting to run with ease if not in perfect alignment, and also to expand and contract or sustain longitudinal thrust or strain. Such a shaft-coupling is desirable in lines of shafting which extend over uneven ground, as in connecting a thrashing-machine with the motor which drives it, or wood-sawing machines with the motor, or in conveying power from a centrally-located engine to surrounding oil-wells, and in numerous other instances. It is also desirable in coupling the shafts of screw-propellers where the shafting is not only liable to be thrown out of alignment by the disposition of the cargo, but is always subject to thrust and strain by the action of the screw-wheels in the water. It is also desirable in steam launches when the engine and boiler are unshipped, when the launch is hoisted upon the vessel, and reshipped after the launch has been replaced in the water, for it is often impossible to secure perfect alignment.

I accomplish the foregoing objects by incorporating in the coupling coiled springs of proper strength and form to sustain the torsional action of communicating power, and also give the necessary flexibility.

My invention does not consist in the employment of said springs to connect two sections of shafting, for springs have thus been employed before; but consists in the construction and combination of parts, as is hereinafter fully pointed out.

Figure 1:
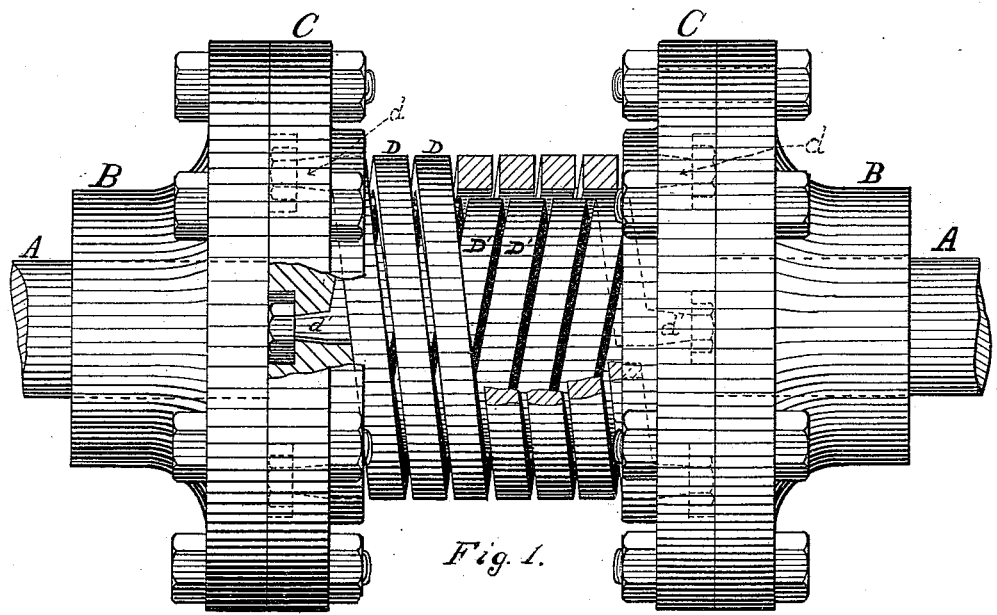
Figure 2:
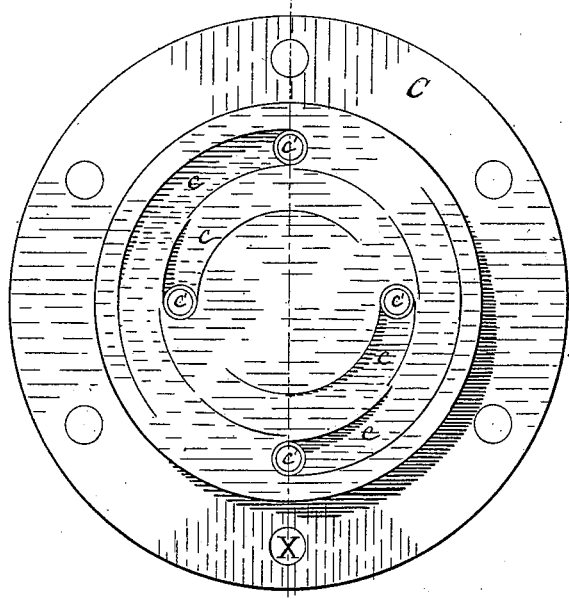
Figure 3:
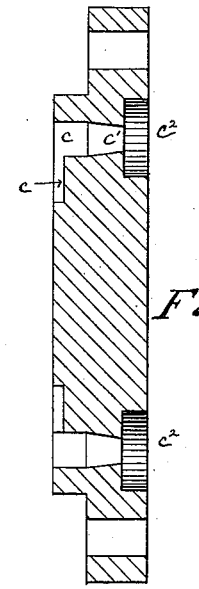

My invention is illustrated in the accompanying drawings, as follows: Figure 1 is a side elevation of one of my couplings with parts broken out to show the construction. Fig. 2 is a plan view of the face of one of the flanges C. Fig. 3 is a cross section of one of said flanges on the line $x$ $x$ in Fig. 2.

A A are the shaft-sections.

B B are ordinary coupling-flanges attached to the contiguous ends of the shaft-sections.

C C are special flanges for connecting with the springs and the flanges B.

D D' are the springs.

There are shown two springs, D, and two springs, D', each of which pairs are coiled together, and the two pairs are coiled in opposite directions, one pair being coiled right hand and the other left hand, and one pair is contained within the other pair. The springs need not be coiled in pairs, but the springs D and D' should be coiled in opposite directions. If the springs are of sufficient diameter to permit it, there may be more than two sets nested together. The ends of the springs are bent out parallel with the axes of the springs and forged tapering, and provided with a screw-thread to receive a nut. (See $d$ and $d'$, Fig. 1.)

The flanges C are provided on their face with inclined sunken faces $c$, to receive the ends of the springs, and tapered perforations $c'$, to receive the forged tips $d$ and $d'$, and on their backs there are recesses $c^2$ around the perforations $c'$, to receive the nuts which screw onto the tips $d$ and $d'$ of the springs D and D'. By observing this construction it will be seen that the springs are firmly secured to the flanges C both against longitudinal and torsional strain.

The flanges C are connected with the flanges B by ordinary bolts and in the ordinary manner.

What I claim as new is—

1. In a shaft-coupling, the combination of flanges B B on the shaft-sections, flanges C C, bolted to said flanges B B, and oppositely-coiled springs D D', one within the other, as shown, and attached to said flanges C C, so as to resist both longitudinal and torsional strains, substantially as set forth.

2. In a shaft-coupling, the combination of oppositely-coiled springs D D', one within the other, and having their ends bent to lie parallel with their axes, and screw-threaded to receive nuts thereon, and flanges C C, having sunken seats $c$, and perforations $c'$, for receiving the ends of said springs, substantially as and for the purposes set forth.

In testimony whereof I affix my signature in presence of two witnesses.

THOMAS LEAMAN.

Witnesses:
ROBT. H. PORTER,
JNO. K. HALLOCK.